United States Patent
Pandy et al.

(10) Patent No.: US 10,275,366 B2
(45) Date of Patent: Apr. 30, 2019

(54) PROTECT INFORMATION STORED IN ECU FROM UNINTENTIONAL WRITING AND OVERWRITING

(71) Applicant: Bendix Commercial Vehicle Systems LLC, Elyria, OH (US)

(72) Inventors: Ananda Pandy, Avon, OH (US); Mark A. Bennett, Lagrange, OH (US); Brendan J. Chan, Elyria, OH (US)

(73) Assignee: BENDIX COMMERCIAL VEHICLE SYSTEMS LLC, El Yria, OH (US)

( * ) Notice: Subject to any disclaimer, the term of this patent is extended or adjusted under 35 U.S.C. 154(b) by 140 days.

(21) Appl. No.: 15/095,497

(22) Filed: Apr. 11, 2016

(65) Prior Publication Data

US 2016/0224476 A1 Aug. 4, 2016

Related U.S. Application Data

(63) Continuation of application No. 13/368,443, filed on Feb. 8, 2012, now abandoned.

(51) Int. Cl.
G06F 12/14 (2006.01)
F02D 28/00 (2006.01)
G07C 5/02 (2006.01)

(52) U.S. Cl.
CPC ......... *G06F 12/1441* (2013.01); *F02D 28/00* (2013.01); *G07C 5/02* (2013.01)

(58) Field of Classification Search
CPC ........ G06F 12/1441; F02D 28/00; G07C 5/02
See application file for complete search history.

(56) References Cited

U.S. PATENT DOCUMENTS

| | | | |
|---|---|---|---|
| 5,523,948 A * | 6/1996 | Adrain | B60R 16/0315 123/480 |
| 5,826,211 A * | 10/1998 | Kobayashi | F02D 41/266 701/115 |
| 5,983,188 A * | 11/1999 | Roessle | B60K 31/047 701/300 |
| 6,088,635 A | 7/2000 | Cox et al. | |
| 6,246,933 B1 | 6/2001 | Bague | |
| 6,298,290 B1 | 10/2001 | Abe et al. | |
| 6,804,752 B2 | 10/2004 | Patterson et al. | |
| 6,823,243 B2 * | 11/2004 | Chinnadurai | G07C 5/085 340/438 |
| 6,950,013 B2 | 9/2005 | Scaman et al. | |
| 7,132,923 B2 * | 11/2006 | Yashiki | G11C 16/102 340/5.21 |
| 7,593,034 B2 * | 9/2009 | DeKeyser | H04N 7/18 348/143 |
| RE41,395 E | 6/2010 | Jambhekar et al. | |

(Continued)

*Primary Examiner* — Nay Tun
(74) *Attorney, Agent, or Firm* — Fay Sharpe LLP

(57) ABSTRACT

Systems and methods that facilitate protecting vehicle impact event data from overwrite include an electronic control unit (ECU) having a processor that records event data related to vehicle operation, a memory that stores the event data, and an electronic tool that communicates with the ECU and comprises a data locking module that sends a data lock signal to the ECU to lock the stored event data as locked data such that the stored event data cannot be overwritten. The ECU, in response to the data lock signal, stores the event data as locked data in a dedicated portion of the memory to preserve the event data for subsequent review.

24 Claims, 4 Drawing Sheets

(56) References Cited

U.S. PATENT DOCUMENTS

| | | | |
|---|---|---|---|
| 8,185,253 B2* | 5/2012 | Teramura | G06F 8/65 |
| | | | 701/1 |
| 8,452,488 B2* | 5/2013 | Suzuki | G06F 21/6218 |
| | | | 340/426.1 |
| 2004/0064227 A1* | 4/2004 | Chinnadurai | G01N 35/00871 |
| | | | 701/31.4 |
| 2004/0193347 A1 | 9/2004 | Harumoto et al. | |
| 2007/0050106 A1* | 3/2007 | Chinnadurai | G07C 5/0858 |
| | | | 701/31.4 |
| 2008/0130156 A1* | 6/2008 | Chu | G11B 20/18 |
| | | | 360/71 |
| 2008/0140281 A1 | 6/2008 | Morris et al. | |
| 2008/0195271 A1 | 8/2008 | Bertosa et al. | |
| 2008/0235224 A1* | 9/2008 | Joseph Rodrigues | |
| | | | G06F 17/30274 |
| 2008/0259161 A1* | 10/2008 | Hellman | G08B 13/19695 |
| | | | 348/148 |
| 2009/0051768 A1* | 2/2009 | DeKeyser | H04N 7/18 |
| | | | 348/143 |
| 2009/0235019 A1 | 9/2009 | Costin et al. | |
| 2010/0042288 A1 | 2/2010 | Lipscomb et al. | |
| 2012/0166038 A1 | 6/2012 | Nishino et al. | |

* cited by examiner

PROTECT INFORMATION STORED IN ECU FROM UNINTENTIONAL WRITING AND OVERWRITING

BACKGROUND

The present application finds particular application in vehicle data preservation, particularly involving event data surrounding an event of interest (e.g. vehicle accident, deceleration above a threshold, vehicle speed over a threshold, etc.). However, it will be appreciated that the described technique may also find application in other data recording systems, other data preservation systems, or other vehicle safety systems.

Conventional vehicle data recording systems do not protect event data recorded at or near the time of a vehicle crash. One data recording approach locks event data during field alteration of a vehicle electronic control unit (ECU). A separate authorized tool is used to update the ECU if event data is stored in the programmable memory in order to prevent the event data from being overwritten. Another conventional data recording approach relates to a video recording unit on a train. The unit continuously records video data until the emergency brake is actuated and the train whistle blows. At that time the video recording stops after a predetermined time period and access to the video information is restricted.

Another classical approach to vehicle data recording relates to a vehicle data recording system that collects vehicle information, including video. The recording device is programmed to continuously record data until triggered by an event, such as sudden acceleration. The vehicle status surrounding the sudden acceleration can be analyzed later. The system records new information in a separate re-writable portion of memory. A competent authority must remove the recording device in order to read the data.

The present innovation provides new and improved vehicle event data locking and unlocking systems and methods, which overcome the above-referenced problems and others.

SUMMARY

In accordance with one aspect, a system that facilitates protecting vehicle impact event data from overwrite comprises an electronic control unit (ECU) having a processor that records event data related to vehicle operation, and a memory that stores the event data. The system further comprises a electronic tool that communicates with the ECU and comprises a data locking module that sends a data lock signal to the ECU to lock the stored event data as locked data such that the stored event data cannot be overwritten. The ECU, in response to the data lock signal, stores the event data as locked data in a dedicated portion of the memory to preserve the event data for subsequent review.

In accordance with another aspect, an ECU that facilitates protecting vehicle impact event data from overwrite comprises a processor that records event data related to vehicle operation, and a memory that stores the event data. The ECU, in response to an authorized data lock signal received from an electronic tool, stores the event data as locked data in a dedicated portion of the memory that cannot be overwritten to preserve the event data for subsequent review.

In accordance with another aspect, an electronic tool that facilitates protecting vehicle impact event data from overwrite comprises a processor that communicates with an ECU in a vehicle, wherein the ECU stores event data related to vehicle operating conditions. The electronic tool further comprises a data locking module that sends a data lock signal to the ECU to lock stored event data as locked data such that the stored event data cannot be overwritten, and a data unlocking module that sends a data unlock signal to the ECU to unlock the locked event data for analysis. Additionally, the electronic tool comprises an authorization module that verifies user-entered authorization information prior to sending one of the data lock signal and the data unlock signal to the ECU.

In accordance with another aspect, a method of protecting vehicle impact event data from overwrite comprises recording, in an ECU, event data related to vehicle operation, and receiving an authorized data lock signal from an electronic tool. The method further comprises, in response to the authorized data lock signal, storing the event data as locked data in a dedicated portion of a vehicle ECU memory that cannot be overwritten, in order to preserve the event data for subsequent review.

According to another aspect, an apparatus for protecting vehicle impact event data from overwrite comprises recording means in an ECU, for recording event data related to vehicle operation, and receiving means for receiving an authorized data lock signal from an electronic tool. The apparatus further comprises storing means for storing, in response to the authorized data lock signal, the event data as locked data in a dedicated portion of a vehicle ECU memory that cannot be overwritten, in order to preserve the event data for subsequent review.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

Figure 1:
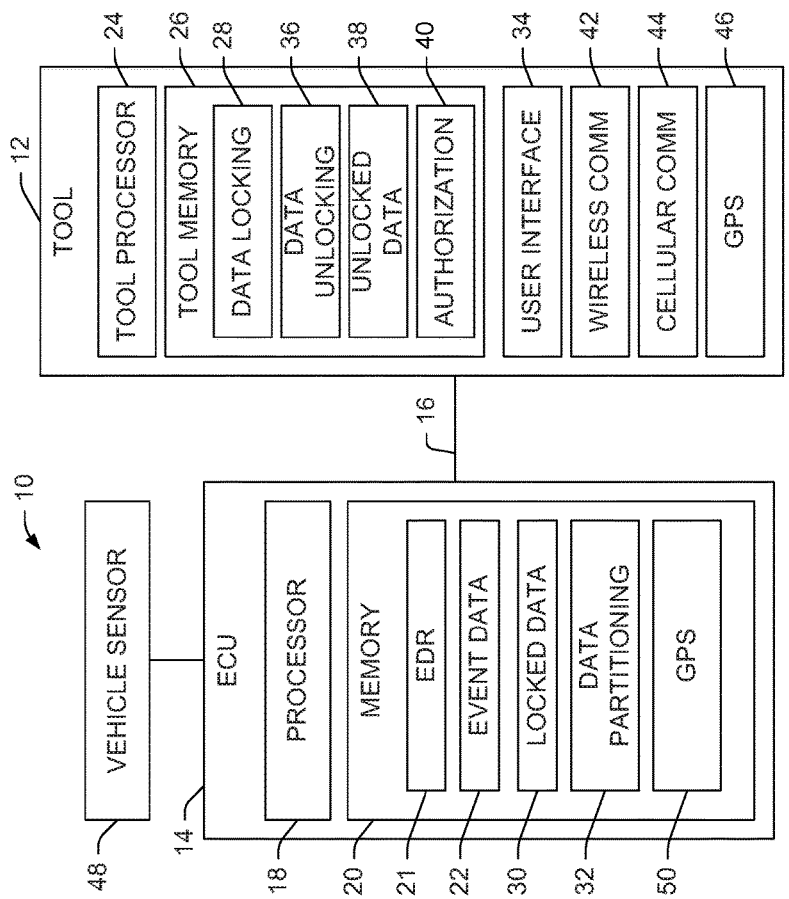
FIG. 1 illustrates a system that facilitates locking an anti-lock braking system (ABS) electronic control unit (ECU) event memory via a serial bus.

FIG. 1 illustrates a system 10 that facilitates locking an electronic control unit (ECU) event memory via a serial bus. The electronic control unit can be an anti-lock braking system (ABS) ECU, an Electronic Stability Control (ESC) ECU, an engine ECU or other ECU that communicates over the vehicle serial bus and has the functional capability to access the desired information and store for later use. Alternatively, an electronic data storage device, separate from an ECU and connected independently to the vehicle serial bus, may be used.

With conventional ABS ECUs, it is difficult to determine the sequence of faults that occur during an event of interest from the stored fault data. There may be one or more faults that occur after an event of interest but that are stored in the ECU as current active faults. The described systems and methods address the above problem by providing a device that communicates with the ECU and requests the ECU to respond by locking its current data and entering a "data vault mode." The data in the ECU can then be extracted by trained personnel, after which the ECU is released from vault mode. This process ensures that the fault data is protected for subsequent analysis and/or evidentiary use. In one example, upon arriving at the scene of an accident, a police officer or the like connects to a diagnostic port on the vehicle with a device to communicate a message or command that puts the ECU in the vault mode.

Accordingly, the system 10 comprises an electronic tool 12 that can be coupled to a vehicle ECU 14 via a serial bus 16. The ECU comprises a processor 18 that executes, and a memory 20 that persistently stores, computer-executable instructions for performing the various methods, functions, protocols, procedures, etc., described herein. The memory 20 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 18. Additionally, "module," as used herein denotes a set of computer-executable instructions (e.g., a routine, sub-routine, program, application, or the like) that is persistently stored on the computer-readable medium or memory and executed by the processor to perform the various methods, techniques, functions, etc., described herein.

The memory 20 stores an event data recording module 21 that is executed by the processor 18 to store event data 22 (i.e., system fault data or the like). The data storage capacity in some systems may be limited, such that the stored event data 22 may comprise a predetermined time period worth of data (e.g., a week, a month, etc.) after which event data is overwritten in a first-in-first-out manner. For example, if a vehicle in which the ECU is employed experiences an event of particular interest (e.g. a vehicle maneuver, location, or operator identity of particular predefined interest) to safety researchers, enforcement agencies, logistics planners, the vehicle owner or operator, it is desirable to preserve that data for subsequent analysis by only that party whish is interested in or has authorization to access it. Accordingly, when an authorized party wishes to query the stored data, the electronic tool is put into communication with the data storage device (e.g. ECU) via a wired or wireless connection. In another example, if a vehicle in which the ECU is employed is in an accident, it is desirable to preserve the most recent event data for subsequent analysis (e.g., to determine the cause of the accident, for use as evidence, etc.). Accordingly, when a law enforcement or public safety personnel (e.g., a paramedic or fireman, etc.) arrives at the scene of the accident, the electronic tool is coupled to the ECU (e.g., via a wired or wireless connection).

The electronic tool comprises a processor 24 that executes, and a memory 26 that persistently stores, computer-executable instructions for performing the various methods, functions, protocols, procedures, etc., described herein. The memory 26 may include volatile, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 24.

Once coupled to the ECU 14, the processor 24 executes a data locking module 28 that transmits a data lock command to the ECU. The data lock command can be transmitted over the serial bus 16 or can be transmitted wirelessly. Upon receiving the data lock command, the ECU enters the vault mode and stores the event data as locked data 30. In one embodiment, the locked data 30 is stored in the memory location where it was originally recorded. In another embodiment, the processor executes a data partitioning module 32 that moves the locked data to a separate memory location that is dedicated to locked data storage and cannot be overwritten. Once locked, the locked data 32 cannot be overwritten or unlocked until an authorized operator unlocks the locked data via an electronic tool 12. It will be understood that the ECU 14 is still functional while the event data is locked, but that the locked event data cannot be overwritten and is preserved.

Partitioning is useful because events of interest are likely to have varying levels of interest to varying parties with varying levels of need and/or authority to access the stored data. For instance, partitioning facilitates managing the stored data so that an authorized party has access to data in his area of interest, need, concern, and/or authority. Access authorizations can be managed via the electronic tool (or a version of a PC-based tool, such as ACOM® from Bendix Commercial Vehicle Systems LLC"). Future events of interest can continue to be stored, while other events may not be stored. Events of only questionable or minimal interest can be discarded after a period of time or upon being overwritten by events of greater interest. For example, the ECU memory can be partitioned into sections such as a National Highway Transportation Safety Association and/or National Transportation Safety Board section that is accessible for research purposes; a Law Enforcement and/or Legal section that is accessible for evidentiary purposes; a Manufacturer section that is accessible for proprietary data for research and development purposes; etc. The data storage and retrieval is managed through partitioning to mitigate unauthorized access to the data.

The electronic tool 12 comprises a user interface 34 via which the operator is presented with selectable options to initiate the data lock procedure. Additionally, when an operator desires to unlock the locked data 30 for analysis, the operator initiates a data unlocking program or module 36 that is executed by the processor 24 to transmit a data unlock command to the ECU. Once unlocked the unlocked event data 38 is stored to the electronic tool 12 for analysis and/or transmission to another storage device.

According to one embodiment, the memory 26 includes an authorization module 40 that is executed by the processor 24 when the electronic tool is coupled to the ECU to verify that the operator is authorized to lock and/or unlock the data. This feature ensures that locked data is not tampered with, and that data locking is performed by an authorized operator (e.g., a law enforcement officer or other public employee). For instance, upon arriving at the scene of an accident and coupling the electronic tool to the ECU of the vehicle, an officer is prompted to enter an authorization code or some other identification information. The electronic tool comprises a wireless communication module 42 (e.g., a transceiver that provides wireless communication functionality to the electronic tool) for communicating with the ECU and/or for communicating with a wireless network serving the area in which the accident occurred. The electronic tool further comprises a cellular communication module 44 (e.g., a transceiver that provides cellular communication functionality to the electronic tool) for communicating with a cellular network serving the area in which the accident occurred. Upon entry of the authorization code or identification information, the electronic tool communicates with a remote server (not shown) to verify the officer's authority to lock the event data. Similarly, when the event data is to be unlocked, the unlocking party enters an authorization code or other identification information, which the electronic tool verifies before transmitting the unlock data command to the ECU.

In another embodiment, the electronic tool 12 comprises a GPS module or system 46 that acquires location information (e.g., coordinates) of the electronic tool. The electronic tool processor 24 appends location information to the locked event data 30 for verification and/or authentication. Such information can he useful if or when the event data is submitted as evidence (e.g., in a legal proceeding or the like related to an accident), for example to verify that the event data corresponds to the accident being litigated or otherwise analyzed. In a related embodiment, the electronic tool processor 24 can obtain current weather condition information (e.g., via the wireless or cellular communication modules), which can also be appended to the locked data. This information, in addition to the GPS and/or timestamp data appended to the locked data can further aid in subsequent analysis of the data. Additionally or alternatively, the ECU 14 includes a GPS module 50 that functions similarly or identically to the GPS 46 of the electronic tool 12.

According to an example, a highway patrol officer at an accident scene employs electronic tool 12 to communicate to the vehicle, ECU 14, brake controllers, or any other data recorder on the vehicle, to broadcast a message to cause the ECU to enter vault mode to protect the data and fault information. In one embodiment the electronic tool is a RDU™ Remote Diagnostic Unit, such as is manufactured by Bendix Commercial Vehicle Systems LLC or a RP120 unit such as the Brake Link® tool manufactured by Nexiq™ Technologies.

In another embodiment, the system 10 comprises a vehicle sensor 48, such as an accelerometer, which indicates a vehicle state, such as deceleration. If the sensor exceeds a predetermined threshold, which triggers an event of interest, the ECU records the data in the partitioned section for a predetermined time period. The authorities can use the electronic tool to collect this information.

In another embodiment, the processor 18 of the ECU 14 retrieves current weather information for the location of the vehicle (e.g., periodically or continuously) as determined by the GPS module. For instance, the processor can retrieve local weather conditions via one or more of the wireless communication module and the cellular communication module. Weather condition information (e.g., raining, snowing, temperature, wet roads, icy conditions, etc.) at the time of a perceived vehicle crash can be appended to the stored event data. Such information can be useful in subsequent event data analysis. In another embodiment, the electronic tool processor 24 performs the above-described weather information retrieval and appending functions.

Figure 2:
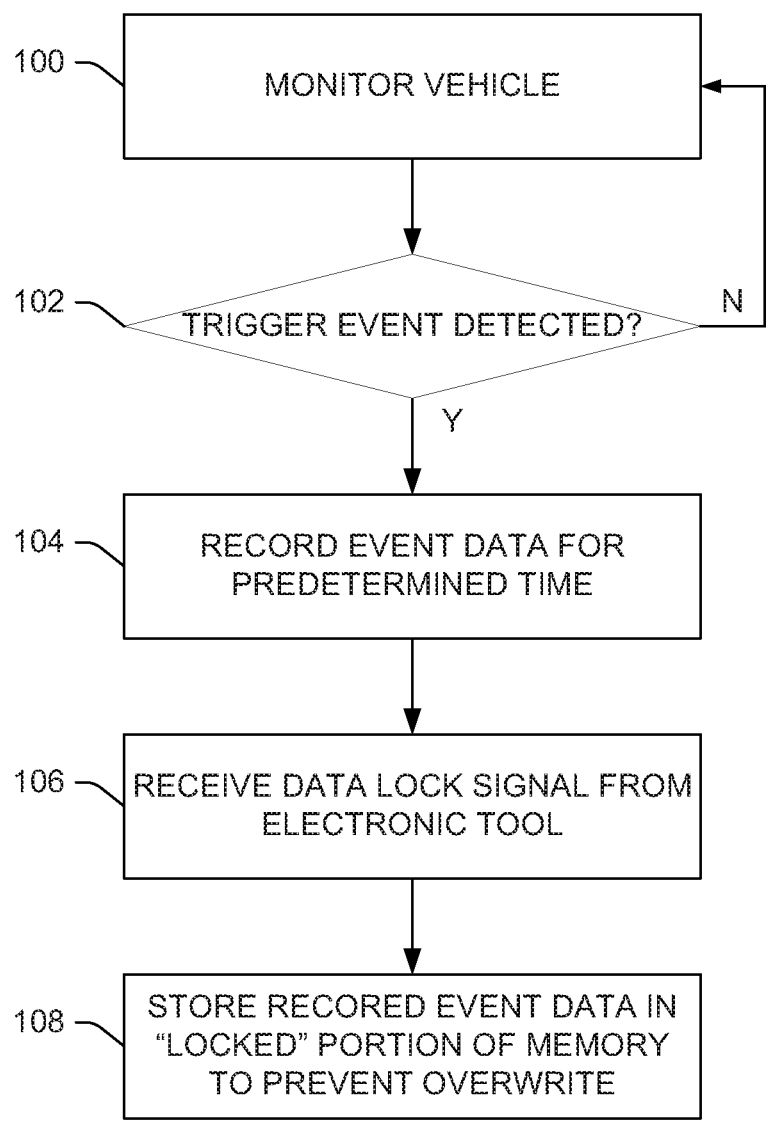
FIG. 2 illustrates a method for preserving event data at the time of a vehicle event of interest
Figure 3:
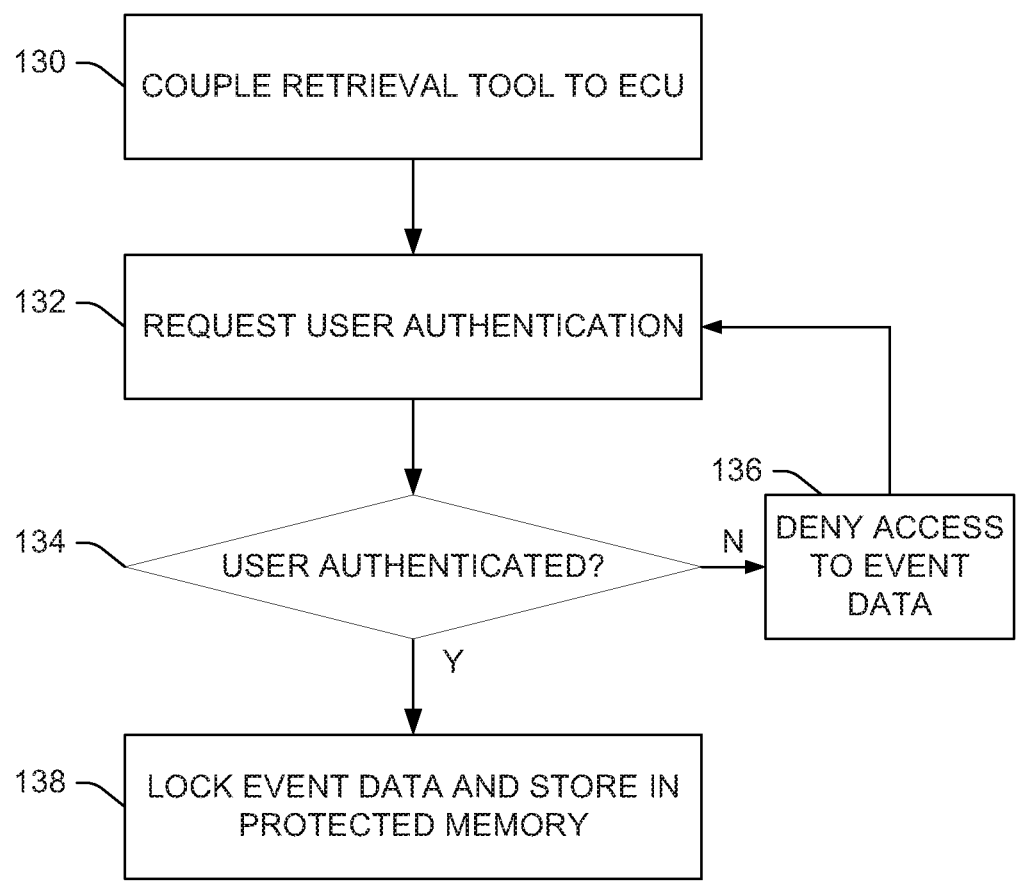
FIG. 3 illustrates a method for locking event data associated with a vehicle event of interest, in accordance with one or more aspects described herein.
Figure 4:
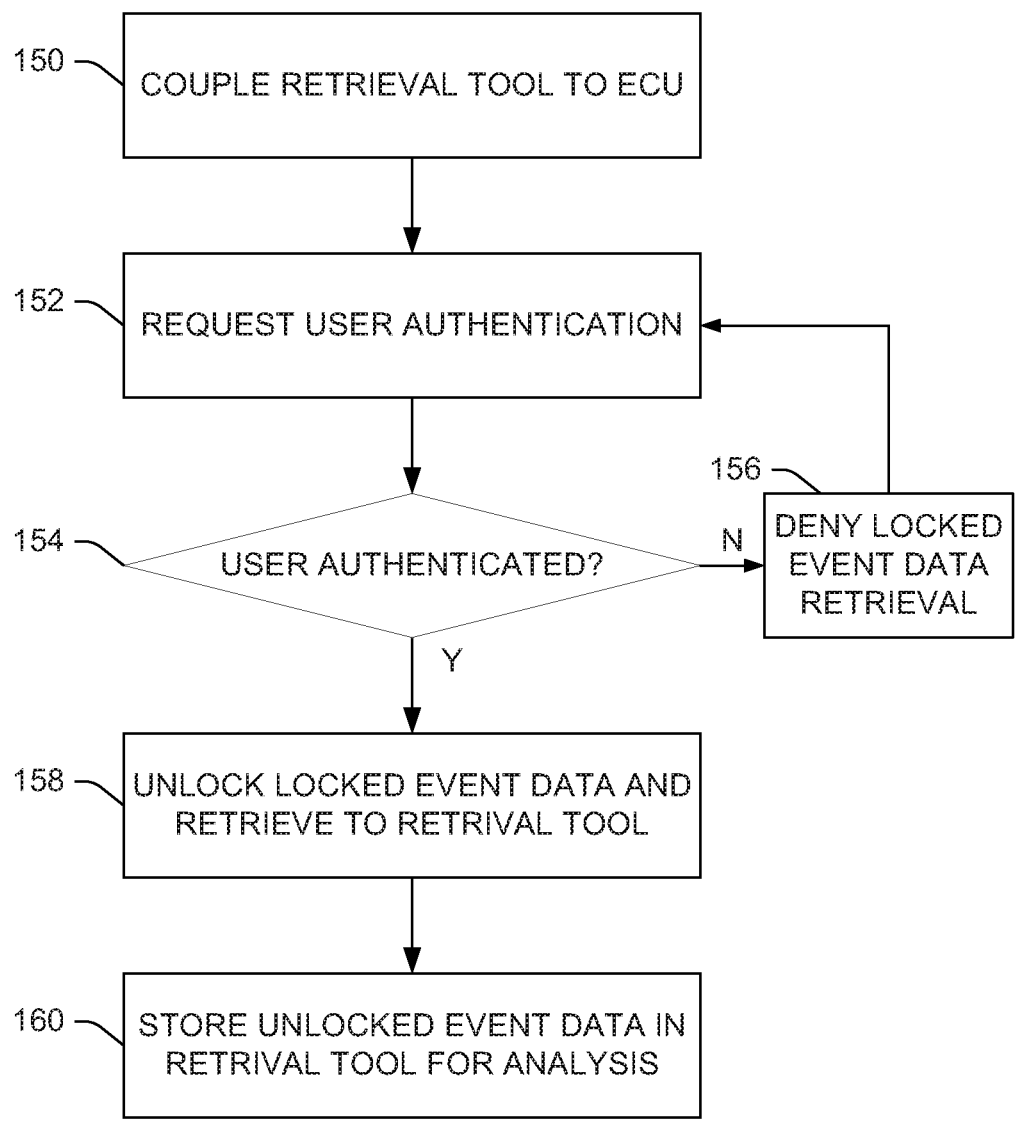
FIG. 4 illustrates a method for unlocking event data associated with a vehicle event of interest, in accordance with one or more aspects described herein.

FIGS. 2-4 illustrate methods such as may be performed by the system of FIG. 1. FIG. 2 illustrates a method for preserving event data at the time of a vehicle accident or the like such as is performed by the ECU 14 and/or the processor 18. At 100, vehicle systems are monitored for fault conditions. At 102, a determination is made regarding whether a trigger event (e.g., an ABS event, a braking event, an acceleration event, an impact event, or some other event that is outside of predetermined tolerances) is detected. If no trigger event is detected, then the method reverts to 100 for continued systems monitoring. If a trigger event is detected at 102, then at 104 event data is recorded for a predetermined time period. In one embodiment, event data that occurred before the trigger event is recorded, e.g. from a data buffer or other memory (not shown), in a portion of the memory dedicated or reserved for event data. For instance, upon detection of the trigger event, the ECU can store event data for 60 seconds prior to the trigger event to 5 minutes after the event (or some other predetermined time period) to dedicated event data memory. At 106, the ECU receives a data lock command from the electronic tool. At 108, the ECU stores the recorded event data in a "locked" portion of the ECU memory to prevent the data from being overwritten (e.g., by fault codes the ECU may detect when the vehicle is towed or the like).

FIG. 3 illustrates a method for locking event data associated with a vehicle accident or impact, in accordance with one or more aspects described herein. At 130, a data retrieval tool such as the electronic tool 12 of FIG. 1 is coupled to the vehicle's ECU. At 132, user authentication is requested. For instance, a user of the electronic tool is prompted to enter an authentication code or other identification information (e.g., digital fingerprint, retina scan, voice recognition data, or any other suitable manner of identifying the user as being authorized to access the ECU). At 134, a determination is made regarding whether the user is authorized to access the ECU. This determination may be made by comparing the user's input authentication or identification information to a remote database (not shown) via a cellular or wireless communication link. If the user is not authorized to access the ECU, then at 136, access to the event data in the ECU is denied. The method then reverts to 132 where user authentication is requested.

If the user is authorized to access the ECU as determined at 134, then at 138, access is granted and the event data is locked and stored in a protected portion of the ECU memory where it cannot be overwritten. Additionally or alternatively, the event data is locked and stored in a protected memory of the electronic tool.

FIG. 4 illustrates a method for unlocking event data associated with a vehicle accident or impact, in accordance with one or more aspects described herein. At 150, a data retrieval tool such as the electronic tool 12 of FIG. 1 is coupled to the vehicle's ECU. At 152, user authentication is requested. For instance, a user of the electronic tool is prompted to enter an authentication code or other identification information (e.g., digital fingerprint, retina scan, voice recognition data, or any other suitable manner of identifying the user as being authorized to access the ECU). At 154, a determination is made regarding whether the user is authorized to access the ECU. This determination may be made by comparing the user's input authentication or identification information to a remote database (not shown) via a cellular or wireless communication link. If the user is not authorized to access the ECU, then at 156, access to the locked event data in the ECU is denied. The method then reverts to 152 where user authentication is requested.

If the user is authorized to access the ECU as determined at 154, then at 158, access is granted and the locked event data is unlocked and retrieved by the retrieval tool. At 160, the unlocked event data is stored in a protected memory of the retrieval tool.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A system that facilitates protecting vehicle event data from overwrite while selectively permitting access to the event data, comprising:
   an electronic control unit (ECU) having a processor that records event data related to vehicle operation; and
   a memory that stores the event data, the memory being partitioned into a plurality of dedicated sections;
   a remote electronic tool that, upon coupling to the ECU after recording of the event data, communicates with the ECU and comprises a data locking module that sends a data lock signal to the ECU;
   wherein the ECU, in response to the data lock signal, stores the event data as locked data, which cannot be overwritten, in one or more selected dedicated sections of the memory to preserve the event data for subsequent review, the one or more of the plurality of dedicated sections being selected as a function of a purpose for which event data was collected, and wherein the stored event data comprises event data recorded for a predetermined time period before and after a trigger event detected by the ECU;
   wherein the electronic tool comprises an authentication module that prompts a user to enter authentication information to access one of the plurality of dedicated sections, verifies the authentication information, and permits the user to at least one of lock the event data and unlock the locked data in the accessed dedicated section.

2. The system according to claim 1, wherein the plurality of dedicated sections comprises at least a transportation safety section, a law enforcement section, and a manufacturer section.

3. The system according to claim 2, wherein:
   the transportation safety section preserves event data related to safety research purposes;
   the law enforcement section preserves event data related to evidentiary purposes; and
   the manufacturer section stores preserves data related to proprietary data for research and development purposes.

4. The system according to claim 1, wherein the electronic tool comprises a data unlocking module that sends a signal to the ECU instructing the ECU to unlock locked data in a specified designated section of the memory.

5. The system according to claim 1, wherein the electronic tool comprises:
   a global positioning system that retrieves coordinate information describing the location of the electronic tool; and
   a processor that appends the coordinate information to the event data whenever the event data is locked or unlocked.

6. The system according to claim 5, wherein the processor retrieves local weather condition information for the location of the vehicle and appends weather condition information to the event data stored by the ECU.

7. An electronic control unit (ECU) that facilitates protecting vehicle event data from overwrite while selectively permitting access to the event data, comprising:
   a processor that records event data related to vehicle operation;
   a memory that stores the event data, the memory being partitioned into a plurality of dedicated sections;
   wherein the ECU, in response to a data lock signal received from an associated remote electronic tool upon coupling to the remote electronic tool after recording the event data, stores the event data as locked data in one or more selected dedicated sections of the memory to preserve the event data for subsequent review, the one or more of the plurality of dedicated sections being selected as a function of a purpose for which event data was collected, and wherein the stored event data comprises event data recorded for a predetermined time period before and after a trigger event detected by the ECU;
   wherein the ECU, upon receiving a data unlock signal comprising authentication information associated with one of the plurality of dedicated sections from the associated electronic tool, unlocks the locked data in the dedicated section associated with the authentication information.

8. The ECU according to claim 7, wherein the plurality of dedicated sections comprises at least a transportation safety section, a law enforcement section, and a manufacturer section.

9. The ECU according to claim 8, wherein:
   the transportation safety section preserves event data related to safety research purposes;
   the law enforcement section preserves event data related to evidentiary purposes; and
   the manufacturer section stores preserves data related to proprietary data for research and development purposes.

10. The ECU according to claim 7, wherein the ECU subsequently receives a data unlock signal from the electronic tool, in response to which the ECU unlocks the locked data in a specified designated section of the memory, wherein the data is read-only when unlocked.

11. The ECU according to claim 7, wherein the ECU comprises:
    a global positioning system that retrieves coordinate information describing the location of the electronic tool; and
    a processor that appends the coordinate information to the event data whenever the event data is locked or unlocked.

12. The ECU according to claim 7, wherein the processor retrieves local weather condition information for the location of the vehicle and appends weather condition information to the event data stored by the ECU.

13. An electronic tool that facilitates protecting vehicle event data from overwrite while selectively permitting access to the event data, comprising:
    a processor that communicates with an associated electronic control unit (ECU) in a vehicle, the ECU having stored therein event data related to vehicle operating conditions, wherein the stored event data comprises event data recorded for a predetermined time period before and after a trigger event detected by the ECU, wherein the processor is communicatively coupled to the ECU after recording of the event data;

a data locking module that sends a data lock signal to the ECU to lock stored event data as locked data in one or more of a plurality of dedicated sections of a partitioned memory such that the stored event data cannot be overwritten; and a data unlocking module that sends a data unlock signal to the ECU to unlock the locked event data of a specified partitioned section of the memory for analysis; and an authorization module that verifies user-entered authorization information prior to sending one of the data lock signal and the data unlock signal to the ECU; and an authentication module that prompts a user to enter authentication information to access one of the plurality of dedicated sections, verifies the authentication information, and permits the user to at least one of lock the event data and unlock the locked data in the accessed dedicated section.

14. The electronic tool according to claim 13, wherein the data lock and unlock signals instruct the ECU to lock or unlock one or more dedicated sections comprising at least a transportation safety section, a law enforcement section, and a manufacturer section.

15. The electronic tool according to claim 13, wherein the electronic tool comprises:

a global positioning system that retrieves coordinate information describing the location of the electronic tool; and a processor that appends the coordinate information to the event data whenever the event data is locked or unlocked.

16. The electronic tool according to claim 13, wherein the processor retrieves local weather condition information for the location of the vehicle and appends weather condition information to the event data stored by the ECU when the event data is locked.

17. The electronic tool according to claim 13, further comprising a user interface on which selectable options are presented to a user to initiate one or more of the data lock and unlock procedures and an authentication procedure associated therewith, and on which unlocked data is presented once received by the electronic tool.

18. A method of protecting vehicle event data from overwrite while selectively permitting access to the event data, comprising:

recording, in one or more of a plurality of dedicated sections of an electronic control unit (ECU) memory, event data related to vehicle operation, wherein the event data comprises event data recorded for a predetermined time period before and after a trigger event detected by the ECU;

receiving from a remote electronic tool, after coupling to the remote electronic tool and after recording of the event data, an authorized data lock signal from the remote electronic tool; and in response to the authorized data lock signal, storing the event data as locked data in a selected dedicated portion of the ECU memory that cannot be overwritten in order to preserve the event data for subsequent review, the one or more of the plurality of dedicated sections being selected as a function of a purpose for which event data was collected; and upon receiving a data unlock signal comprising authentication information associated with one of the plurality of dedicated sections from the associated electronic tool, unlocking the locked data in the dedicated section associated with the authentication information.

19. The method according to claim 18, wherein the dedicated sections comprise at least a transportation safety section, a law enforcement section, and a manufacturer section.

20. The method according to claim 19, wherein:

the transportation safety section preserves event data related to safety research purposes;

the law enforcement section preserves event data related to evidentiary purposes; and the manufacturer section preserves event data related to proprietary data for research and development purposes.

21. The method according to claim 18, further comprising receiving a data unlock signal from the electronic tool, and unlocking the locked data in a dedicated section of the ECU memory in response to the data unlock signal.

22. The method according to claim 18, further comprising:

retrieving coordinate information describing the location of at least one of the electronic tool and the ECU; and appending the coordinate information to the event data whenever the event data is locked or unlocked.

23. The method according to claim 18, further comprising:

retrieving local weather condition information for the location of at least one of the vehicle and the electronic tool; and appending the weather condition information to the event data stored by the ECU.

24. An apparatus for protecting vehicle event data from overwrite while selectively permitting data access to the event data, comprising:

recording means for recording, in one or more of a plurality of dedicated sections of an electronic control unit (ECU) memory, event data related to vehicle operation;

receiving means for receiving from a remote electronic tool, after coupling to the remote electronic tool and after recording of the event data, an authorized data lock signal from the remote electronic tool; and processing means configured to, in response to the authorized data lock signal, store the event data as locked data in a selected dedicated portion of the ECU memory that cannot be overwritten in order to preserve the event data for subsequent review, the one or more of the plurality of dedicated sections being selected as a function of a purpose for which event data was collected, and wherein the stored event data comprises event data recorded for a predetermined time period before and after a trigger event detected by the ECU; and authentication means for prompting a user to enter authentication information to access one of the plurality of dedicated sections, verifying the authentication information, and permitting the user to at least one of lock the event data and unlock the locked data in the accessed dedicated section.

* * * * *